United States Patent [19]
Durand et al.

[11] 3,855,162
[45] Dec. 17, 1974

[54] POLYMERIZATION OF VINYL CHLORIDE MONOMER IN THE PRESENCE OF SILICEOUS FILLERS

[75] Inventors: Jean-Pierre Durand, Chatou; Claude Fabre, Montrouge; Maseh Osgan, Paris, all of France

[73] Assignee: Gerdec, Paris, France

[22] Filed: Apr. 20, 1973

[21] Appl. No.: 352,949

[30] Foreign Application Priority Data
Apr. 24, 1972  France .............................. 72.14391

[52] U.S. Cl. ............... 260/17.4 SG, 260/29.6 WQ, 260/42.49, 260/42.53

[51] Int. Cl. ............................................ C08f 45/04

[58] Field of Search .... 260/41 A, 17.4 ST, 17.4 SG, 260/29.6 WQ, 42.53; 117/126 AB

[56] References Cited
UNITED STATES PATENTS

| | | | |
|---|---|---|---|
| 3,265,644 | 8/1966 | Herman et al. | 260/41 R |
| 3,305,498 | 2/1967 | Herman et al. | 260/8 |
| 3,318,826 | 5/1967 | Bridgeford | 260/41 R |
| 3,519,594 | 7/1970 | Michaels | 260/41 R |
| 3,692,816 | 9/1972 | Faille et al. | 260/41.5 A |

*Primary Examiner*—Allan Lieberman
*Assistant Examiner*—J. H. Derrington
*Attorney, Agent, or Firm*—I. William Millen

[57] ABSTRACT

A process for producing reinforced polymers comprising the step of polymerizing vinyl chloride in the presence of a phyllosilicate filler such as asbestos, the improvement wherein said polymerizing is conducted in the presence of 1–20 percent by weight water based on the weight of the phyllosilicate filler, and preferably with the addition of a small amount of alcohol.

25 Claims, No Drawings

POLYMERIZATION OF VINYL CHLORIDE MONOMER IN THE PRESENCE OF SILICEOUS FILLERS

BACKGROUND OF THE INVENTION

This invention relates to a process of preparing reinforced polymers by polymerization or copolymerization of vinyl chloride monomer in the presence of phyllosilicates. Another aspect of the invention is to provide reinforced polymer compositions useful as such or as strengthening fillers for other vinyl polymers.

It is known that the phyllosilicates incorporated in materials such as thermoplastics, elastomers or the like improve or change the properties of these materials, and impart better mechanical strength thereto. For this purpose, several varied processes have been proposed. Generally, the fillers are added to matrices which have already been polymerized, but in such cases, the filler can be incorporated in only relatively small amounts. For example, reinforced vinyl chloride polymers or polyethylenes are obtained by liquefying the polymeric matrix either by heating or by dissolving same in a solvent, then by incorporating the siliceous filler into the plastic or liquid polymer by mixing or grinding equipment. Such a process has the disadvantage of generally resulting in a poor dispersion of the filler in the polymeric matrix, as well as polymer degradation on occasion.

The direct polymerization of vinyl chloride monomer in the presence of different fillers (cellulose, wood, asbestos, silica) has also been proposed. These fillers are pre-treated with large quantities of water at high temperature, then mixed with vinyl chloride monomer, and the resultant mixture is polymerized in suspension. However, the purpose of this process is the preparation of polymers containing only small proportions of filler (below 10 percent), this process being described in detail in U.S. pat. No. 3,265,644.

It has also been proposed to carry out the bulk polymerization of vinyl chloride monomer in the presence of phyllosilicates by using exactly the same conditions as that used for the vinyl chloride monomer alone. However, numerous experiments conducted by as under these conditions have showed that the rate of polymerization is low and even sometimes equal to zero. Another serious disadvantage of this process is that it requires the use of large quantities of initiators (for example, peroxides) in order to initiate the polymerization which makes this process even more unattractive for use on industrial scale.

SUMMARY OF THE INVENTION

Bearing in mind the disadvantages set forth above in connection with prior art processes, an object of this invention is to provide an improved process which is substantially, if not completely, devoid of such disadvantages.

Another object is to provide polymerizable and polymerized compositions in accordance with the improved process of this invention.

A further object is to employ the polymerized composition as fillers for other polymeric systems.

Still another object is to provide shaped objects based on the polymerized composition of this invention.

Upon further study of the specification and appended claims, other objects and advantages will become apparent.

To attain these objects, in a process whereby vinyl chloride is polymerized in admixture with phyllosilicate filler, the process is improved by conducting the polymerization in the presence of water in an amount equal to 1–20 percent by weight of the filler.

It has been observed that when the quantity of water is less than 1 percent by weight based on the weight of the siliceous filler, the polymerization velocity, i.e., the rate of polymerization, is not substantially improved. For a water quantity in excess of 20 percent, the reaction medium is detrimentally diluted without any further improvement of the polymerization. It is a preferred practice to effect the polymerization in the presence of 2–15 percent, water based on the weight of the siliceous filler. The siliceous fillers used according to the invention generally contain a small amount of water depending on several factors such as their constitution, the method of drying, preliminary treatments they may have been submitted to, the atmospheric relative humidity, etc. It is thus necessary to take into consideration this initial amount of water in order to adjust the water quantity present in the polymerization medium.

It has been also surprisingly found that it is possible to further improve the polymerization of vinyl chloride monomer in the presence of siliceous filler not only by controlling the water quantity, but also by adding an organic compound having an alcohol function into the reactive medium. This organic compound is employed in quantities of between 0.05 percent and 15 percent, and preferably 0.5 percent and 7 percent by weight, based on the weight of the siliceous filler.

According to the process of the invention, the alcoholic organic compounds used are preferably the lower aliphatic alcohols, in particular those having 1 to 6 atoms of carbon, especially methanol, ethanol, n-and isopropanol n-, sec-, iso- and tert.-butanol. The commercial and inexpensive alcohols such as methanol, ethanol or isopropanol are thus very satisfactory. It is also possible to use other organic compounds which are more complex but have at least one alcohol function, such as diacetone alcohol; free or monoethers, e.g., methyl, ethyl, or butyl ethers, or esters, e.g., acetates, of ethylene glycol, of diethylene glycol, and of polyethylene glycols having an average molecular weight from 190 to 7,500; polyvinyl alcohol and at least partially hydrolyzed polyvinyl acetate. Natural polyols such as sorbitol, saccharose or soluble starch as well as the corresponding compounds partially or completely esterified can also be used.

The addition of water and of an alcoholic organic compound in the polymerization medium can be achieved according to different methods. The siliceous filler and the desired quantities of water and alcohol are introduced into a vessel while stirring, taking into account the water of hydration of the siliceous filler. The siliceous filler can also be suspended in the liquid vinyl chloride. Preferably before initiating the polymerization, the medium is maintained at room temperature under continuous stirring for 0.5 to 24 hours, in order that the siliceous filler absorbs the desired amount of water and alcohol and also that an homogeneous reaction mixture is obtained.

According to the present invention, the polymerization in the presence of siliceous fillers is preferably carried out under the conventional conditions of the bulk polymerization or copolymerization of vinyl chloride monomer. When the polymerization is carried out in the gaseous phase, it is necessary to add the water and the alcoholic organic compound before the incorporation of peroxides or other polymerization initiators.

The polymerization can also be conducted by precipitation polymerization in the presence of non-aqueous diluents which do not dissolve the polymer such as n-butane, pentanes, hexanes, benzene, toluene, cyclohexane, methylcyclohexane, as well as various petroleum distillates or mixtures of precited diluents. The polymerization can also be achieved by solvent polymerization in the presence of solvents which dissolve the polymer such as acetone, methyl ethyl ketone, tetrahydrofuran, ethylene dichloride, chlorobenzene or mixtures thereof. A mixture of diluent and solvent can also be used. Whatever the above-mentioned type of polymerization is used, conventional methods of polymerization or copolymerization are employed. The reaction is generally achieved at a temperature within the range 30° to 90° C., and preferably between 40° and 75° C., under the autogenous pressure of the monomer(s) or under vacuum, the monomer(s) being continuously or discontinuously introduced. As a general rule, catalysts which are soluble in the monomer(s) and usually used as polymerization initiators are added to the reaction medium. Examples of such initiators include but are not limited to; di-n-propyl, diisopropyl, di-sec-butyl and di-tert.-butylcyclohexyl peroxydicarbonate, dilauryl peroxide, dibenzoyl peroxide, 2,4-dichloro dibenzoyl peroxide, acetyl benzoyl peroxide, acetyl cyclohexansulfonyl peroxide, as well as the azo compounds such as azobisisobutylronitrile.

A mixture of one of the cited dicarbonate peroxides and of dilauryl peroxide can also be used. The amount of peroxide to be used is usually 0.0005–1 percent based on the weight of the monomer. The molecular weight of the reinforced polymers can be controlled by carrying on the polymerization in the presence of conventional chain transfer agents such as acetaldehyde or trichloroethylene.

The monomers which can be utilized for the preparation of reinforced copolymers with vinyl chloride monomer are those monomers containing a vinyl group and derivatives thereof such as, for example, vinyl acetate, vinyl stearate, vinylidene chloride, methyl acrylate, ethyl acrylate, butyl acrylate, ethyl hexyl acrylate, methyl, ethyl, butyl or ethylhexylmethacrylate, acrylic acid, methacrylic acid, maleic anhydride, dimethyl, diethyl, dibutyl, diethylhexyl fumarate or maleate, acrylonitrile, methacrylonitrile and methyl, isobutyl, lauryl or cetylvinylether. Further examples of comonomers and reaction conditions are found in the literature, e.g., Vinyl and Related Polymers, Schildnecht, and the Encylopedia of Polymer Science and Technology.

The phyllosilicates can be utilized in the practice of the present invention in different forms, that is with or without a preliminary treatment. Natural fibers, silanated fibers having different contents of grafted carbon, or hydrolyzed fibers can be used. By a phyllosilicate is meant "a silicate in which the $SiO_4$ tetrahedra occur linked together in infinite two-dimensional sheets," A Dictionary of Mining, Mineral and Related Terms, 1968, P.W. Thrush, and Staff of Bureau of Mines, U.S. Department of the Interior, Superintendent of Documents, U.S. Government Printing Office, Washington, D.C. Examples of phyllosilicate minerals include but are not limited to micas, e.g., vermiculite, asbestos, and other minerals, whether of the lamellar type or of the fibrous type comprising tetrahedral layers consisting essentially of silicon and oxygen and octahedral layers consisting essentially of oxygen and metallic atoms other than silicon, such as magnesium, aluminum and/or iron.

The natural fibers used in the present invention are commercial fibers which are defibrillated using mechanical means. The silanated fibers are obtained by using the process disclosed in U.S. Pat. No. 3,692,816, issued on Sept. 19, 1972. In this process, an organomineral material is prepared in a single step by a reaction, in the presence of an inorganic acid and of an alcohol, of a phyllosilicate with an organosilane (for example, methylvinyldichlorosilane) having at least one reactable organic group which is capable of subsequent polymerization and which also has at least one hydroxyl, halogen or alkoxy group fixed on the silicon of the organosilane molecule, or which has the disiloxane function. The silanted fibers so-obtained are defined by the weight percent of carbon grafted onto the fiber by the organosilane.

The hydrolyzed fibers employed in the present invention are fibers obtained according to the hydrolysis process which is also described in U.S. Pat. No. 3,692,816, but in which the fibers are treated with only an acid-alcohol mixture without adding the organosilane. Although no carbon is actually grafted onto these fibers, they are defined as above, the percent of carbon representing in this case the accessibility of the grafting sites to the carbon compounds.

The amount of phyllosilicate used according to the process of the invention can vary over a considerable range. The amounts most often utilized are between 40 and 70 g. per liter of liquid monomer. Obviously, using a lower quantity of phyllosilicate does not present any problem, whereas the use of a higher quantity depends on the nature and the quality of the phyllosilicates. With fibrous products such as chrysotile or sepiolite, the maximum concentrations are about 100 g. per liter of liquid monomer for grade 4 fibers (the grade indicates the length of the fibers). With fibers having a higher grade, that is shorter fibers, it is possible to increase the concentration up to 200 g/l.

With non-fibrous lamellar phyllosilicates such as vermiculite, it is possible to incorporate 200 g. and even up to 400 g. of siliceous filler per liter of liquid monomer.

The reinforced polymers obtained according to the invention exhibit excellent mechanical and thermal properties, and can be used as such in all the conventional applications of reinforced materials.

In accordance with an important aspect of the invention, the reinforced polymers can be advantageously used as strengthening fillers in commercial polymerized vinyl matrices. By mechanical incorporation, compositions are obtained having technical properties very close to those of the products prepared by direct polymerization and containing constituents of the same nature in identical proportions.

The reinforced materials according to the invention obtained either by direct polymerization or by mechanical incorporation of the polyermized fillers have mechanical properties and thermal stability which are notably improved in comparison with reinforced polymers obtained by the addition of phyllosilicates which have not been submitted to a polymerization treatment. In particular, the mechanical incorporation of the polymerized fillers of the invention does not cause any degradation of the matrix and is carried out more easily as a better dispersion is obtained in a shorter time.

Polymerized fillers are employed containing 5 percent to 95 percent, preferably at least 15 percent and not more than 25 percent, by weight of polymer based on the weight of the mixture of phyllosilicates plus polymer. The fillers containing less than 5 percent of polymer having no advantage in comparison with a phyllosicate alone. Nevertheless, it is advantageous to use fillers containing a relatively low quantity of polymer (less than 50 percent) because it is thus possible to shorten the polymerization time without any deleterious effect on either the later mechanical incorporation, or for the qualities of the reinforced polymer.

In accordance with the present invention, the commercial polymerized vinyl matrices used include the homopolymers, copolymers, and post-chlorinated polymers of vinyl chloride or mixtures thereof either between themselves or with other compatible polymers.

The conventional copolymers are obtained by polymerization of vinyl chloride monomer with at least another monomer such as, for example, vinyl acetate, alkyl acrylates and methacrylates, alkyl fumarates, maleates, chlorofumarates and chloromaleates, alkylvinylethers, vinylidene chloride, vinylpyridine, ethylene, propylene, acrylonitrile and methacrylonitrile. Polymers obtained by all the conventional methods of polymerization can be used; bulk, solution, suspension, fine suspension or emulsion polymerization. It is also possible to use mixtures of resins obtained by different methods, for example, mixtures of suspension type and emulsion type polymers. In any case, the literature is replete with descriptions of known polymers of vinyl chloride, attention being invited to the two texts previously cited for additional details.

The mechanical incorporation of the reinforcing fillers (phyllosilicates + polymer) is achieved by conventional methods. The different ingredients; filler, resin or a mixture of resins, and various additives (plasticizers, lubricants, stabilizers, etc.) are mixed and heated to a temperature above the fluxing temperature of the resin for a sufficient time to obtain the dispersion of the fillers. The blending is carried out with conventional equipment such as a Banbury mixer, rubber mill, Brabender roller, continuous screw-mixer, etc. Then the composition may be molded, extruded or generally worked over according to the conventional methods.

It is preferred that the reinforced polymers of vinyl chloride produced by direct polymerization in accordance with the invention be intimately blended with unreinforced previously polymerized polymers of vinyl chloride in quantities varying with the final reinforcing desired effect.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth in uncorrected degrees Celsius; unless otherwise indicated, all parts and percentages are by weight.

EXAMPLE 1

Into a stainless steel three-neck autoclave provided with a blade stirrer, a reagent inlet pipe and an exhaust pipe connected to a manometer, there were introduced 35g. of silanated asbestos fibers obtained by treatment with methylvinyldichlorosilane. The asbestos fibers contained 2 percent of grafted carbon by weight. An amount of water was added into the autoclave so that the siliceous filler contained 5 percent by weight of water and then the medium was stirred for 16 hours.

After the above treatment, the autoclave was sealed and purged with a small amount of vinyl chloride monomer in order to expel the air. 700g. of vinyl chloride monomer and 70mg. of bis (tert. butylcyclohexyl) peroxycarbonate were introduced into the autoclave. The mixture was rapidly heated to 50° C., and this temperature was maintained during a period of 60 minutes.

The mixture was cooled and the unreacted monomer was distilled. The reaction mixture was dried at 60° C., at 0.2 mm.Hg for a period of 24 hours. There was thus obtained 42 g. of fibrous product containing 7 g. of vinyl chloride polymer (PVC).

Due to the use of silanated siliceous fillers, a composition is obtained in which the polymer is chemically bound to the fiber and not merely mixed as is the case for compositions obtained by mechanical means alone. In order to demonstrate this property, the amount of non-extractable polymer is determined by treatment of the fibrous product with a solvent for vinyl chloride polymer such as methylethylketone for example. In a Soxhlet extractor, the fibrous product was subjected to extraction with methylethylketone for a period of 6 hours. After this treatment, there was found that the non-extractable part contained 2.2 percent by weight of chlorine, which corresponds to 3.5% by weight of nonextractable PVC.

The polymerized filler so obtained (that is the 42 g. of fibrous product containing 7 g. of polyvinyl chloride) was mechanically incorporated in a commercial suspension type PVC having a Fikentscher $k$ value between 57 and 61. The amount of commerical PVC was adjusted in order that the final percentage of the siliceous filler is equal to 20 percent based on the weight of the mixture. The mixture containing the polymerized filler, the suspension type PVC and the conventional ingredients such as stabilizers and lubricants was mixed on a rubber mill at 140° C., then molded by compression at 180° C. The mechanical properties of the obtained product were determined and were compared with the same commercial PVC but which is unfilled. The results are shown in the following Table.

TABLE 1

| Composition | Flexural modulus kgf*/cm² | Flexural Strength kgf*/cm² |
| --- | --- | --- |
| Comparison PVC (unfilled) | 30,000 | 800 |
| Filled PVC | 49,000 | 900 |

* kgf represents a force equal to the weight of one kilogram mass, measured at the surface of the earth at sea level

EXAMPLE 2

Example 1 was repeated by using silanated asbestos fibers containing 0.5 percent of grafted carbon, and the water content was adjusted so that the siliceous filler contained 12 percent of water. On completion of the reaction, there were obtained 44.5 g. of fibrous product containing 9.5 g. of PVC. The product was treated with methylethylketone. It had a nonextractable PVC content of 1.8 percent by weight.

By way of comparison, the same reaction was carried out under the same conditions but employing 0.8 percent of water based on the weight of fibers. There were thus obtained 37.2 g. of fibrous product containing 2.2 g. of PVC.

EXAMPLE 3

Example 1 was repeated, but using hydrolyzed fibers corresponding to the silanated fibers having a grafted carbon content of 2 percent by weight.

Before polymerization, the water content was adjusted to 10 percent. There were obtained 43.2 g. of fibrous product containing 8.2 g. of PVC.

The same reaction was carried out under the same conditions but in the presence of only 0.5 percent of water. Under these conditions, no polymer was obtained.

The obtained polymerized filler was mechanically incorporated in a commercial PVC, the amount of which was adjusted so that the final percentage of hydrolyzed fibers was equal to 20 percent. As shown in Table 2, reinforced polymer had mechanical properties better than the unfilled polymer.

TABLE 2

| Composition | Flexural modulus kgf/cm² | Flexural Strength kgf/cm² |
| --- | --- | --- |
| Unfilled PVC | 30,000 | 800 |
| Filled PVC | 46,000 | 860 |

EXAMPLE 4

Example 1 was repeated but the reaction was conducted with the addition of 5 percent of ethanol based on the weight of the fibers. There were thus obtained 45.4 g. of fibrous product containing 10.4 g. of PVC.

EXAMPLE 5

A composition "A" was prepared by following Example 1 but employing silanated fibers containing 0.5 percent of grafted carbon (instead of 2 percent of grafted carbon) and 140 mg. of initiator (instead of 70 mg.), and by heating at 50° C., for a period of 6 hours. There were thus obtained after drying, 116 g. of polymerized fibrous product containing 81 g. about 70 percent of PVC, and 30 percent by weight of silanated fibers containing 0.5 percent of grafted carbon.

By employing the same technique as above, but by terminating the polymerization after 3 hours, there were obtained 77 g. of a fibrous product containing 42 g. of PVC. A composition "B" was prepared by incorporating this product in a commercial suspension type PVC (Solvic 229 sold by Solvic Society) in a quantity calculated so that the composition "B" contained 30 percent of fibers. These products were blended on a cylinder mill (rubber mill) for a period of 30 minutes at 140° C., in the presence of 2.6 percent of stabilizer agents, 1 percent of shear additive and 0.2 percent of lubricant based on the weight of the resin.

By way of comparison, a composition "C" was obtained by mechanical mixing of silanated fibers having 0.5 percent of carbon (which have not been treated by polymerization) and of Solvic 229 in the presence of the same additives. The PVC amount was adjusted so that the filler percentage was equal to 30 percent.

From the three above compositions, test plates were obtained by molding at 180° C., in order to measure mechanical properties which are given in Table 3.

TABLE 3

| Composition | A | B | C |
| --- | --- | --- | --- |
| Dispersion time on cylinders (minutes) | | 10 | 15 |
| Tensile impact strength (kg/cm/cm² | 100 | 97 | 84 |
| Impact strength Charpy (kg/cm/cm² | 22 | 19 | 14 |
| Flexural modulus (kgf/cm²) | 60,000 | 58,000 | 58,000 |
| Flexural strength (kgf/cm² | 1,160 | 1,055 | 1,060 |
| Torsion modulus at 60° C. (kgf/cm²) | 36,000 | 32,000 | 31,000 |
| Torsion modulus at 140° C. (kgf/cm²) | 150 | 200 | 195 |

The compositions A and B exhibit improved mechanical properties, that is the filled polymers obtained either directly according to the process of the present invention or when used as strengthening filler by already prepared products. In the latter case, the dispersion time is considerably less that required for fibers which have not been subjected to a polymerization treatment.

EXAMPLE 6

Example 4 was repeated but with the use of silanated fibers having 0.5 percent of carbon and a water content of 8 percent based on the weight of fibers and with 5 percent by weight of isopropyl alcohol. There were thus obtained 46.7 g. of fibrous product containing 11.7 g. of PVC. The extraction test showed that the fibrous product contained 4 percent of non-extractable PVC.

The fibrous product was incorporated in a commercial suspension type PVC having a Fikentscher value $k$ comprised between 57 and 61. The amount of PVC was proportioned so that the percentage of the siliceous fillers was equal to 20 percent. The reinforced polymer had the following mechanical properties:

Flexural modulus — 30,000 kgf/cm²  
Flexural strength — 800 kgf/cm²

EXAMPLE 7

Example 6 was repeated but the isopropyl alcohol was substituted by diacetone alcohol. There were obtained 46 g. of fibrous product containing 11 g. of PVC. The extraction test showed that there was 10 percent of non-extractable PVC.

This fibrous product incorporated in the commercial PVC used in the preceding example yielded a polymer having the following properties:

Flexural modulus — 50,000 kgf/cm²  
Flexural strength — 910 kgf/cm²

EXAMPLE 8

Example 4 was repeated by using natural fibers (commercial grade 4 asbestos sold under the name of Cassiar AK) adjusting the water content to 15 percent based on the weight of the fibers and employing 0.5 percent of partially hydrolyzed polyvinyl acetate (87 mole percent of polyvinyl alcohol). The water content was adjusted by removing the excess water necessary for dissolving the polymeric alcohol. After polymerization, 46.8 g. of fibrous product were obtained containing 11.8 g. of PVC.

EXAMPLE 9

A composition "D" was obtained by mechanical incorporation of a polymerized filler of composition "A" (containing 30 percent) of silanated fibers having 0.5 percent of carbon as described in Example 5) in commercial postchlorinated PVC (compound Lucorex PM/BP 30 sold by the firm Rhone Progil) and in the presence of conventional additives. The postchlorinated PVC amount was adjusted so that the final polymer contained 20 percent by weight of silanated fibers. A composition "E" containing only the unfilled compound Lucorex PM/BP 30 was tested for purposes of comparison, in Table 4 there are set forth the properties of compositions "D" and "E."

TABLE 4

| PROPERTIES | D | E |
|---|---|---|
| Density (g/cm$^3$) | 1.68 | 1.54 |
| Flexural Strength (kgf/cm$^2$) | 1,130 | 1,000 |
| Flexural Modulus (kgf/cm$^2$) | 59,000 | 33,000 |
| Deformation Temperature under load (°C.) | 113 | 100 |
| Vicat Softening Point under 5 kg. (°C.) | 113 | 103.5 |

Table 4 shows that the polymerized fillers improve the properties of the postchlorinated PVC. In particular, the deformation temperature under load is increased, which constitutes a particularly interesting property.

EXAMPLE 10

The polymerized fillers silanted to 0.5 percent of carbon obtained according to Example 6 and containing 25 percent by weight of PVC, were mechanically incorporated in various mixtures of commercial PVC, by employing the mode of operation described in the preceding examples. The proportion of silanated fibers was 16 percent based on the total weight of the composition. Table 5 tabulates the proportion of resin in parts by weight in each composition.

TABLE 5

| Composition No. | F | G | H | I |
|---|---|---|---|---|
| Solvic 229 | 80 | 60 | — | — |
| *Solvic 136 | 20 | 20 | 100 | — |
| *Lucovyl Ma 6028 | — | 20 | — | — |
| *Lucovyl BB 8010 | — | — | — | 100 |

*Solvic 136:
Emulsion type PVC provided by the firm Solvic
*Lucovyl MA 6028:
Vinyl acetate-vinyl chloride copolymer provided by the firm Rhone-Progil
*Lucovyl BB 8010:
Bulk vinyl chloride polymer provided by the firm Rhone-Progil The compositions were mixed for a period of 30 minutes and molded. Their mechanical properties are set forth in Table 6.

TABLE 6

| Composition | F | G | H | I |
|---|---|---|---|---|
| Tensile Impact Strength (kgf/cm/cm$^2$) | 187 | 103 | 217 | 110 |
| Impact Strength Charpy (kgf/cm/cm$^2$) | 80% unbroken | 34 | unbroken | 21 |
| Flexural Modulus (kgf/cm$^2$) | 48,000 | 51,000 | 48,000 | 50,000 |
| Flexural Strength (kgf/cm$^2$) | 940 | 950 | 905 | 965 |

The properties of the compositions described in the Examples have been determined according to the following standards:

Tensile impact strength: Standard BNMP 1047
Impact strength Charpy: Standard ISO R 179
Flexural strength and modulus: Standard ISO R 178
Torsion modulus: ASTM D 1053
Deformation temperature under load: ISO R 75
Vicat softening point under 5 kg.: ISO R 306.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for producing reinforced polymers comprising the step of polymerizing vinyl chloride in the presence of a phyllosilicate filler and a polymerization, said polymerizing being either bulk polymerization, solvent polymerization, or precipitation polymerization in the presence of non-aqueous diluent,
the improvement wherein said polymerizing is conducted in a polymerization medium in the controlled presence of 1–20 percent by weight water based on the weight of the phyllosilicate filler the water content of the polymerization medium being adjusted by the addition of water thereto.

2. A process according to claim 1, said polymerizing being conducted in the further presence of an organic compound having an alcohol function.

3. A process according to claim 2 wherein the organic compound having an alcohol function is employed in an amount of 0.05–15 percent based on the weight of the phyllosilicate filler.

4. A process according to claim 2 wherein the organic compound having an alcohol function is a lower aliphatic alcohol of 1–6 carbon atoms.

5. A process according to claim 2, the organic compound having an alcohol function is diacetone alcohol, a free, or methyl, ethyl, butyl monoether or acetate ester of ethylene glycol, diethylene glycol, polyethylene glycol, having an average molecular weight from 190 to 7,500, polyvinyl alcohol, or partially hydrolyzed polyvinyl acetate.

6. A process according to claim 2 wherein the organic compound having an alcohol function is sorbitol, saccharose or soluble starch.

7. A process according to claim 1 wherein the polymerizing is conducted in the presence of at least one non-aqueous diluent which does not dissolve the polymer.

8. A process according to claim 1 wherein the polymerizing is conducted in the presence of a solvent for polyvinyl chloride.

9. A process according to claim 1 wherein the polymerizing is conducted in bulk.

10. A process according to claim 1 wherein the phyllosilicate filler is hydrolyzed.

11. A process according to claim 1 wherein the phyllosilicate filler is silanated.

12. A process according to claim 1 wherein the phyllosilicate filler is natural.

13. A process according to claim 1 wherein the phyllosilicate filler is hydrolyzed asbestos.

14. A process according to claim 1 wherein the phyllosilicate filler is silanated asbestos.

15. A process according to claim 1 wherein the phyllosilicate filler is natural asbestos.

16. A process according to claim 1 wherein said polymerizing is conducted in the presence of 2–15 percent by weight water based on the weight of the phyllosilicate filler.

17. A process as defined by claim 1 wherein the water added to the polymerization medium is adsorbed into the phyllosilicate prior to the initiation of the polymerization.

18. A process as defined by claim 17 wherein the water is absorbed into the phyllosilicate prior to contact with vinyl chloride.

19. A process as defined by claim 17 wherein the phyllosilicate is natural asbestos, hydrolyzed asbestos or silanated asbestos.

20. A process as defined by claim 18 wherein the phyllosilicate is natural asbestos, hydrolyzed asbestos or silanated asbestos.

21. A process as defined by claim 20 wherein the adsorption of water is conducted by stirring the asbestos and water for 0.5 to 24 hours at about room temperature.

22. A process as defined by claim 19 wherein the phyllosilicate is silanated asbestos.

23. A process as defined by claim 20 wherein the phyllosilicate is silanated asbestos.

24. A process according to claim 19, said polymerizing being conducted in the further presence of an organic compound having an alcohol function.

25. A process according to claim 24 wherein the organic compound having an alcohol function is employed in an amount of 0.05–15 percent based on the weight of the phyllosilicate filler.

* * * * *